United States Patent
Oguchi et al.

(10) Patent No.: US 6,625,658 B1
(45) Date of Patent: Sep. 23, 2003

(54) END EQUIPMENT AND ROUTER

(75) Inventors: Naoki Oguchi, Kanagawa (JP); Satoshi Nojima, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/211,153

(22) Filed: Dec. 14, 1998

(30) Foreign Application Priority Data

Jun. 30, 1998 (JP) .......................................... 10-184699

(51) Int. Cl.⁷ ............................................ G06F 15/173
(52) U.S. Cl. ........................ 709/238; 709/218; 370/392; 370/397; 370/401
(58) Field of Search .................. 395/200.15; 370/392, 370/397, 447, 396, 401, 402, 160; 709/238; 713/160, 161

(56) References Cited

U.S. PATENT DOCUMENTS

| | | | | |
|---|---|---|---|---|
| 5,287,345 A | * | 2/1994 | Osmon et al. ................. 370/60 |
| 5,583,862 A | * | 12/1996 | Callon ......................... 370/397 |
| 5,583,996 A | * | 12/1996 | Tsuchiya ................ 395/200.15 |
| 5,781,552 A | * | 7/1998 | Hashimoto ................... 370/447 |
| 5,822,320 A | * | 10/1998 | Horikawa et al. ........... 370/396 |
| 5,996,021 A | * | 11/1999 | Civanlar et al. ............. 709/238 |
| 5,999,536 A | * | 12/1999 | Kawafuji et al. ............ 370/401 |
| 6,047,329 A | * | 4/2000 | Horikawa et al. ........... 709/238 |
| 6,104,713 A | * | 8/2000 | Nagami et al. .............. 370/392 |
| 6,185,680 B1 | * | 2/2001 | Shimbo et al. .............. 713/160 |
| 6,243,759 B1 | * | 6/2001 | Boden et al. ................ 709/238 |

* cited by examiner

*Primary Examiner*—Ayaz Sheikh
*Assistant Examiner*—Oanh Duong
(74) *Attorney, Agent, or Firm*—Katten Muchin Zavis Rosenman

(57) ABSTRACT

An end equipment (including a terminal equipment and a router) executes a destination address resolution of a data packet. In a network layer, when a packet transmitter detects that a direct route of an input packet is not registered in a routing table a path manager transmits an inquiry packet, demands a preparation of a point-to-point logical interface of the direct route based on a data link layer address of the destination included in the received response packet, and registers the prepared logical interface in the routing table.

14 Claims, 16 Drawing Sheets

FIG.11A

| | /⎯ 52_1 |
|---|---|
| IP ADDRESS | 133.160.113.2 |
| NET MASK | 255.255.255.0 |
| INTERFACE TYPE | point-to-point |

FIG.11B

| | /⎯ 52_2 |
|---|---|
| IP ADDRESS | 133.160.113.2 |
| NET MASK | 255.255.255.0 |
| INTERFACE TYPE | point-to-point |
| DESTINATION | 133.160.115.2 |

FIG.11C

| | /⎯ 52_3 |
|---|---|
| IP ADDRESS | IP ADDRESS OF OWN HOST INTERFACE |
| NET MASK | NET MASK OF OWN HOST INTERFACE (all "1" point-to-point INTERFACE) |
| DESTINATION IP ADDRESS | DESTINATION HOST ADDRESS |
| INTERFACE TYPE | INTERFACE TYPE (point-to-point TYPE) |
| FLAG | STATUS FLAG OF INTERFACE (UP,···) |
| POINTER TO VC STRUCTURE | LINK INFORMATION TO VC STRUCTURE MANAGING VC IN CONNECTION ORIENTED NETWORK |

FIG. 12A

ROUTING TABLE 44_1 IN HOST 40_1

| IP ADDRESS | NET MASK | NEXT HOP ROUTER | OUTPUT INTERFACE |
|---|---|---|---|
| 133.160.113.1 | 255.255.255.255 | | atm0 |
| 133.160.113.3 | 255.255.255.255 | | atm1 |
| 133.160.113.4 | 255.255.255.255 | | atm2 |
| 133.160.113.5 | 255.255.255.255 | | atm3 |
| 133.160.114.0 | 255.255.255.0 | 133.160.113.1 | atm0 |
| 133.160.115.0 | 255.255.255.0 | 133.160.113.1 | atm0 |
| ... | ... | ... | ... |

ROUTING TABLE 44_2 IN ROUTER 30_1

| IP ADDRESS | NET MASK | NEXT HOP ROUTER | OUTPUT INTERFACE |
|---|---|---|---|
| 133.160.113.2 | 255.255.255.255 | | atm0 |
| 133.160.113.3 | 255.255.255.255 | | atm1 |
| 133.160.113.4 | 255.255.255.255 | | atm2 |
| 133.160.113.5 | 255.255.255.255 | | atm3 |
| 133.160.114.1 | 255.255.255.255 | | atm0 |
| 133.160.114.3 | 255.255.255.255 | | atm1 |
| 133.160.114.4 | 255.255.255.255 | | atm2 |
| 133.160.115.0 | 255.255.255.0 | 133.160.114.1 | atm0 |

ROUTING TABLE 44_3 IN ROUTER 30_2

| IP ADDRESS | NET MASK | NEXT HOP ROUTER | OUTPUT INTERFACE |
|---|---|---|---|
| 133.160.113.0 | 255.255.255.0 | 133.160.114.2 | atm0 |
| 133.160.114.1 | 255.255.255.255 | | atm1 |
| 133.160.114.2 | 255.255.255.255 | | atm0 |
| 133.160.114.3 | 255.255.255.255 | 133.160.114.2 | atm0 |
| 133.160.114.4 | 255.255.255.255 | | atm2 |
| 133.160.115.2 | 255.255.255.255 | | atm3 |
| 133.160.115.3 | 255.255.255.255 | | atm4 |
| 133.160.115.4 | 255.255.255.255 | | atm5 |

ROUTING TABLE 44_1 AFTER ADDRESS RESOLUTION IN HOST 40_1

| IP ADDRESS | NET MASK | NEXT HOP ROUTER | OUTPUT INTERFACE |
|---|---|---|---|
| 133.160.113.1 | 255.255.255.255 | | atm0 |
| 133.160.113.3 | 255.255.255.255 | | atm1 |
| 133.160.113.4 | 255.255.255.255 | | atm2 |
| 133.160.113.5 | 255.255.255.255 | | atm3 |
| 133.160.114.0 | 255.255.255.0 | 133.160.113.1 | atm0 |
| 133.160.115.2 | 255.255.255.255 | | atm4 |
| 133.160.115.0 | 255.255.255.0 | 133.160.113.1 | atm0 |
| ... | ... | ... | ... |

| | 52 |
|---|---|
| INTERFACE NAME | atm1 |
| OWN IP ADDRESS | 133.160.115.2 |
| DESTINATION IP ADDRESS | 133.160.113.2 |
| INTERFACE TYPE | point-to-point |
| INTERFACE STATUS | UP |
| POINTER OF VC STRUCTURE | ADDRESS |

FIG.13B

| | 53 |
|---|---|
| DESTINATION ATM ADDRESS | xxxxxxxxxxxxxx |
| VPI/VCI | 0/32 |
| AAL TYPE | AAL5 |

FIG.14A

| | |
|---|---|
| INTERFACE NAME | atm4 |
| OWN IP ADDRESS | 133.160.113.2 |
| DESTINATION IP ADDRESS | 133.160.115.2 |
| INTERFACE TYPE | point-to-point |
| INTERFACE STATUS | UP(AVAILABLE) |
| POINTER TO VC STRUCTURE | ADDRESS |

| | |
|---|---|
| DESTINATION ATM ADDRESS | xxxxxxxxxxxxxx |
| VPI/VCI | 0/32 |
| AAL TYPE | AAL5 |

| IP ADDRESS | NET MASK | NEXT HOP ROUTER | OUTPUT INTERFACE |
|---|---|---|---|
| 133.160.115.2 | 255.255.255.0 | 133.160.115.2 | atm4 |

E4

END EQUIPMENT AND ROUTER

BACKGROUND OF THE INVENTION

1. Field of the Invention

The present invention relates to an end equipment and a router, and in particular to an end equipment and a router which execute a destination address resolution of a data packet.

In recent years, a Non-Broadcast Multi Access (hereinafter abbreviated as NBMA) network represented by an ATM (Asynchronous Transfer Mode) network has numerously come into use for a network environment centering around a Distance Carrier and a network provider. In the mechanism of a data transmission a connection type of the NBMA network is quite different from a connectionless type broadcast network such as an Ethernet and the like. However, in either of both networks, an address resolution protocol (hereinafter referred to as ARP protocol) is required for recognizing a data link layer address each hardware has from a network layer logical address of a destination end equipment to which a packet is transmitted.

2. Description of the Related Art

In general, an end equipment or apparatus is connected to a LAN which is a subnetwork, and LAN's are mutually connected with a router which is a relaying or repeating equipment to form an enterprise network, a campus network and the like.

When the end equipments communicate with each other within the same subnetwork, it is possible to transmit a packet directly to a destination end equipment. However, the end equipments in different subnetworks transmit the packet to a router at the boundary of the subnetworks for the direct transmission. The router which has received the packet determines to which router the packet should be transmitted in order to deliver the packet to the destination end equipment and transfers the packet to the next router. In this way, it also becomes possible to communicate with the end equipments in the different subnetworks.

It is to be noted that the end equipment transmits the packet by a transmission processor in an OS (operating system). The OS has an address list of the network, which can be reached from itself, as a routing table. In each of table entries, a destination IP address, its own output interface, a gateway address and the like are written.

The gateway address indicates the IP address of the router to which the packet is to be sent next, in order to send the packet to a destination end equipment in a subnetwork other than the home subnetwork. When the destination is for the same subnetwork, not the IP address of the router but that of the destination end equipment or its own IP address is set for the gateway address.

In addition, the OS holds an ARP table for a data link layer whereby a network layer address corresponds to a data link layer address.

When the packet is inputted including the destination address designated by the network layer address, for instance, the IP address (hereinafter referred only to as the IP address), the transmission processor retrieves the routing table with the destination IP address as a key, and obtains the output interface and the gateway address.

When the destination end equipment is in the same subnetwork, the transmission processor retrieves the ARP table corresponding to the output interface to obtain a hardware address corresponding to the IP address for the communication. When the destination end equipment is in another subnetwork, the transmission processor retrieves the ARP table with the address of a gateway router obtained from the routing table as a key.

When no entry is found in the ARP table, the OS makes a MAC address demand for the destination IP address to all of the end equipments within the same subnetwork by using an ARP protocol. The MAC address having been obtained, it becomes possible to make the end equipment communicate with the router.

For instance, the ARP table which the end equipment in a conventional Ethernet in the broadcast network holds, where the IP address corresponds to the MAC address, enables the recognition of the MAC address from the IP address of the end equipment or the gateway which can be reached directly, as well as the communication between the end equipment and the router by using this MAC address.

In addition, the ARP protocol inquires the MAC address which is the data link layer address of all of the end equipments in the network by broadcast to obtain the same.

FIGS. 15 and 16 show examples of a conventional ARP protocol. In these examples, protocols on an ATM network which has been often used especially in recent years as an example of an NBMA network are shown. Over an ATM network 10, subnetworks 20__1–20__3 (hereinafter occasionally referred to as "20" in general) are provided, and the subnetworks 20__1, 20__2 are mutually connected with a router 30__1 and the subnetworks 20__2, 20__3 are mutually connected with a router 30__2. Also, the subnetworks 20__1, 20__3 are connected to end equipments 40__1, 40__2 (hereinafter occasionally referred to as "40" in general).

FIG. 15A shows an example of an ATM__ARP (ATM Address Resolution Protocol; hereinafter referred to as ATM__ARP protocol). In this example, the subnetwork 20 is a logical subnetwork (LIS: Logical IP Subnetwork) in a network layer. To the subnetwork 20__1 is further connected an end equipment 40__3 and to each logical subnetwork 20 are connected ATM__ARP servers 31__1–3 (hereinafter occasionally referred to as "31" in general).

The ATM__ARP protocol is designed to achieve an equal function to an ARP protocol on an ATM-LAN. Namely, it is the ARP protocol in an IPoverATM which carries out the transfer of an IP packet by using an ATM connection, provided between the end equipments by an ATM address instead of the MAC address, especially an SVC (Switched Virtual Connection).

In operation, first of all, each of the end equipments 40 registers its own IP address and ATM address in the ATM__ARP server which manages itself.

Sending a data packet addressed to the end equipment 40__2 of a different logical subnetwork 20__3 where no connection is established, the end equipment 40__1 sends an ARP request packet in which the destination IP address is added to the ATM__ARP server 31__1.

The ATM__ARP server 31__1 returns an ARP response packet including the ATM address of a next hop router 30__1 to the end equipment 40__1. The end equipment 40__1 transfers the packet to the router 30__1, which executes the address resolution by the ATM__ARP server 31__2 to transfer the packet to the router 30__2.

The router 30__2 recognizes the ATM address of the end equipment 40__2 by sending the ARP request packet to the ATM__ARP server 31__3, and completes the communication by sending the data packet to the end equipment 40__2.

Since there is originally no concept of broadcast in the NBMA network 10, it is impossible to make any inquiry by broadcast. Therefore, by preparing the ATM_ARP server 31, the ATM_ARP protocol executes a registering management of the ATM address for the end equipment within each of the logical subnetworks 20 to execute the address resolution. Each of the logical subnetworks 20 corresponds to an area, on the NBMA network 10 of the end equipment, of which each of the ATM_ARP servers 31 is in charge.

Namely, the logical subnetwork 20 is logically made over the ATM network 10 which can be communicated only with the. ATM address which is the address of the data link layer. Therefore, if only the ATM address of the end equipment 40_2 of the destination is recognized even when the communication is provided over the different logical subnetworks 20, using this address enables a source end equipment 40_1 to set up a VC (Virtual Connection) which is a direct path to the destination end equipment and to directly transmit the packet.

However, since the ATM_ARP protocol has to provide the packet communication over the logical subnetworks 20 through the router, the direct path connection between the end equipments which the original ATM network can provide cannot be set up.

As a protocol which provides a mechanism of the direct path connection, there is an NHRP (Next Hop Resolution Protocol; hereinafter referred to as NHRP protocol) proposed in an IETF (Internet Engineering Task Force).

FIG. 15B shows an example of the NHRP protocol. This example is different from the ATM_ARP protocol in FIG. 15A in that the ATM_ARP server 31 is not connected to the each of the logical subnetworks 20 and each of the routers 30_1–30_3 forms an NHS (NEXT Hop Server; hereinafter referred to as NHS server) in principle, which also works as a router.

First of all, each end equipment 40 registers its own IP address and ATM address in the NHS server 30 of the LIS to which each end equipment 40 belongs respectively.

Receiving the packet addressed to the end equipment 40_2 of the different logical subnetwork 20_3, the end equipment 40_1 transmits an NHRP resolution request packet, in which the IP address of the end equipment 40_2 is written, to the NHS server 30_1.

Since the destination IP address is not for the end equipment within the same subnetwork which the NHS server 30_1 manages, the NHS server 30_1 which has received the NHRP resolution request packet transfers it to the next NHS server 30_2 according to the routing table. The NHS server 30_2 determines that the destination IP address is for the logical subnetwork 20_3 under its management, retrieves the table of the ATM address (not shown) which the end equipment within the managed logical subnetwork holds, and transmits an NHRP resolution response packet including the ATM address of end equipment 40_2 to the end equipment 40_1 of a transmitting source of the resolution demand when there is an entry to hit.

The end equipment 40_1 recognizes the ATM address for the destination IP address from the NHRP resolution response packet, and by using this address a direct virtual connection (VC; referred to as a direct path) 62 is set up to the end equipment 40_2. Since the direct path 62 does not go through the NHS server 30, it becomes possible to have a communication at high speed without influences of a delay of the packet reconstruction in the NHS server 30, a transfer delay or the like.

Namely, the NHRP protocol is thought to be a technique of the ATM_ARP protocol expanded even to the end equipment in a different logical subnetwork.

It is to be noted that although the end equipment 40_1 transmits the data packet inputted before the direct path 62 is set up by using a hop-by-hop path 60 which goes through the routers 30_1, 30_2 after the direct path 62 is set up the end equipment 40_1 transmits the data packet through this path 62.

FIG. 16 shows an example of an RISP (Responder Initiated Shortcut Path) proposed in the Japanese patent application No. 9-41159. In this example, it is different that the routers 30_3–5 do not include an NHS server function, compared with the NHRP protocol in FIG. 15B.

The method of setting up the direct path between the end equipments 40_1 and 40_2 will now be described as follows:

The end equipment 40_1 receives the data packet addressed to the end equipment 40_2, prepares a call back request packet including its own ATM address, and transmits this packet to the end equipment 40_2 via a routing route 60 via the router.

The end equipment 40_2 calls the direct path by using the ATM address of the end equipment 40_1 included in the received packet, and resends a call back response packet including its own ATM address via the virtual connection 62 which has already been set up.

Namely, the address resolution and the direct path setting are executed at the same time. The end equipment 40_1 transmits the IP packet addressed to the subsequent end equipment 40_2 via the direct path.

FIG. 17 shows an example of a conventional ATM_ARP. In this example, the communication over the subnetworks through the router is not shown, different from the ATM_ARP shown in FIG. 15A, and the subnetworks (LIS1–LIS3) 20_1–3 are connected to output interfaces atm0–atm2 of the end equipment 40_1, respectively. The end equipments 40_2–40_5 are further connected to the subnetwork 20_1.

The IP addresses of the subnetworks 20_1–20_3 are "133.160.115.0", "133.160.114.0", and "133.160.113.0", respectively. The IP address of the output interface atm0 of the end equipment 40_1 is "133.160.115.3", and the IP addresses of the end equipments 40_2–40_5 are "133.160.115.10", "133.160.115.21", "133.160.115.33", and "133.160.115.47", respectively.

FIG. 18 shows a routing table 44 the end equipment 40_1 shown in FIG. 17 holds in the network layer and an ATM_ARP conversion mechanism 51 the data link layer holds.

The ATM_ARP conversion mechanism 51 comprises interface structures 52_1–52_4, an ATM_ARP table 54, and a VC (Virtual Connection) structure 53.

The operation of the end equipment 40_1 will now be described referring to FIG. 17 and FIG. 18 as follows: An IP protocol processor 55 of the end equipment 40_1; ① receives a data packet 70 addressed to the end equipment 40_2 whose IP address is "133.160.115.10"; ② retrieves the routing table 44 with the IP address "133.160.115.10" as a key, retrieves again with "133.160.115.0" to which a subnet mask "255.255.255.0" is applied because there is no hit, and recognizes the output interface "atm0"; ③ obtains the ATM address "47.0091811 . . . CE.00" of the destination end equipment by the retrieval of the ARM_ARP table which "atm0" has with the IP address "133.160.115.10" as a key; ④ obtains a VC number="VPI=0, VCI=32" from the VC structure 53; and ⑤ transmits the data packet 70 to the VC.

Moreover, when ① receiving the packet whose destination IP address is "140.151.120.5", ⑥ the IP protocol processor 55 hits the point-to-point type interface "tun0" (not shown), and ⑦ transmits the packet to the interface "tun0".

When there is an entry but no VC in the ATMARP table 54, the packet is transmitted after the VC is prepared based on the entry ATM address "47.009181 . . . CE.00".

The address resolution and the data packet transmission in the conventional end equipment are summarized as follows:

① In the ARP protocol, the end equipment inquires the MAC address which is the data link layer address of all of the end equipments within one subnetwork by broadcast. Therefore, the end equipment can achieve the address resolution only by the function of the data link layer regardless of the IP protocol in the network layer.

② In the ATM_ARP protocol in the NBMA network composed of one logical subnetwork, the end equipment transmits an inquiry packet via the VC set up in the ATM_ARP server for the address resolution. The end equipment can achieve the address resolution only by the function of the data link layer.

③ In the ATM_ARP protocol in the NBMA network composed of a plurality of logical subnetworks, the end equipment has to communicate over logical subnetworks via the router. Therefore, both of the functions of the data link layer and the network layer are required for the address resolution.

④ In the NHRP protocol, the end equipment requires a routing function which is a network layer function for the address resolution and a function of the data link layer which converts the network layer address into the data link layer address.

⑤ In the RISP, the end equipment is composed so as to require the routing function of the network layer which transmits the call back request packet and not to require an address conversion mechanism of the data link layer.

Namely, in the ARP protocol of the above ①, ②, the end equipment is formed peculiar to the type of the data link layer as the ARP and ATM_ARP exist in the Ethernet. Accordingly, the development of an exclusive ARP function is required for the introduction of a new data link layer, which leads to an increase in cost for the development.

In the above ③, ④, and ⑤, the end equipment requires the routing function for the address resolution in the network layer and the address conversion function of the data link layer. In addition, a connection type NBMA network and a broadcast network of the Ethernet or the like which is a connection less type network are completely different from each other as to a data transmission mechanism, and a address conversion mechanism which converts the network layer logical address of the data packet transmission to the data link layer address.

Also, in the same NBMA network, the conversion mechanism is different depending on whether the area where data link layer address can be recognized should be limited only to a logical subnetwork or extended to the NBMA network in its entirety.

Accordingly, there is no portability between the protocols because the network layer and the data link layer are too closely related to be divided.

SUMMARY OF THE INVENTION

It is accordingly an object of the present invention to provide an end equipment, which execute a destination address resolution of a packet, which provides a packet transmitting system and an address resolution protocol which can be all processed in the network layer regardless of the difference between the NBMA network and the broadcast network and the difference between one logical subnetwork and a plurality of logical subnetworks for the area of the address resolution in the NBMA network, and which has a good portability.

[1] To achieve the above-mentioned object, an end equipment according to the present invention, referring to FIG. 1, comprises; an interface manager 42 which prepares a logical interface 47, provided between a network layer and a data link layer, corresponding to a direct route or a routing route, a routing table 44 indicating a corresponding relationship between a network layer address of a destination of an input packet and the logical interface, a packet transmitter 43 which transmits the input packet to the logical interface referring to the routing table 44 with the network layer address as a key, and a path manager 45 which transmits both of an inquiry packet for inquiring a data link layer address of the destination and the input packet to a preset logical interface 47 of the routing route when the logical interface for the direct route of the input packet is not registered in the table and which registers the logical interface the interface manager has established in the routing table 44 by demanding the interface manager 42 to prepare the logical interface for the direct route based on the data link layer address of the destination included in a received response packet.

In operation, the packet transmitter 43 in a source end equipment (including the router or a terminal equipment) receives an input data packet 70 from an upper layer, and retrieves the routing table 44 by a signal 81 with the network layer address of a destination end equipment as a key. As a result of the table retrieval, when there is found no direct route to directly reach the destination end equipment which belongs to the same or a different subnetwork, the packet transmitter 43 transmits the data packet 70 by a signal 82 to the logical interface of the routing route included in the interface 47 and notifies the path manager 45 that there is no direct route by a signal 84.

The path manager 45 includes its own data link layer address and network layer address, prepares an inquiry packet 95 for inquiring the data link layer address of the destination end equipment, and transmits it to the logical interface of a preset routing route. The data packet 70 and an inquiry packet 83 having been transmitted to the logical interface are transmitted to a router by a method which is suitable for each of the data link layers.

The path manager 45 which has received response packets 90, 91 for the inquiry packet via the interface 47 from the destination end equipment recognizes the data link layer address and the network layer address of the destination end equipment included in the response packet 91, and notifies it to the interface manager 42 which may be included in the path manager 45. The interface manager 42 prepares a new logical interface of the point-to-point type corresponding to the direct route to the destination end equipment.

In addition, the path manager 45 registers the point-to-point type interface in the routing table 44 by a signal 92 so that the point-to-point type logical interface may indicate that there is a direct route to the destination end equipment.

Thereafter, the data packet 70 addressed to the destination end equipment which has been inputted to the packet transmitter 43 will be transmitted to the destination end equipment by the direct route through the point-to-point type interface with the signals 81, 82 and 83.

As a result, since the point-to-point type logical interface corresponds to the data link layer address of the destination, the network layer address of the destination and the data link layer address of the destination correspond to each other. Accordingly, the address conversion from the network layer address to the data link layer address in the data link layer is not required, and all processes are executed in the network layer. In addition, the way of transmitting the data packet to physical media after the transmission thereof to the interface 47 depends on the media and the transmission function of the data link layer.

[2] Also, in the present invention, an end equipment which works as a receiving destination, as shown in FIG. 1, comprises; a routing table 44 indicating a corresponding relationship between a network layer address of a destination for an inquiry packet 90 (91) which is an input packet and a logical interface, a path manager 45 which determines that the received inquiry packet 90 is addressed to itself and prepares a response packet 85 including its own data link layer address, and a packet transmitter 43 which transmits the response packet 85 (81, 82) to a routing route included in the logical interface 47 retrieved from the routing table 44 with a network layer address of a transmitting source included in the inquiry packet 90 addressed to itself as a key.

FIG. 2 shows an example (1) of the address resolution which uses an end equipment according to the present invention. A logical subnetwork 20 is provided in an NBMA network 10. The logical subnetworks 20_1, 20_2 and the logical subnetworks 20_2, 20_3 are mutually connected with the routers 30_1, 30_2 respectively. The logical subnetworks 20_1, 20_3 are connected to the end equipments 40_1, 40_2, respectively.

An inquiry packet 71 transmitted from the end equipment 40_1 is inputted to the end equipment 40_2 via a routing route 60.

A response packet 72 to the inquiry packet 71 is made in the end system 40_2 and is sent to a routing route 61. The response packet 72 is transmitted to the end equipment 40_1 via the routers 30_1, 30_2.

The NBMA network 10 in FIG. 2 may comprise a broadcast network.

[3] Also, in the present invention, a router which connects a plurality of subnetworks established on the network may comprise; as shown in FIG. 1, a routing table 44 indicating a corresponding relationship between a network layer address of a destination for a packet 90 and a logical interface 47, and a path manager 45 which transmits an inquiry and a response packet which are not addressed to the same path manager to the logical interface of a routing route referring to the routing table 44 with the network layer address of the destination included in a received inquiry packet and a response packet 91 as a key.

Namely, as shown in FIG. 1, when the path manager 45 has detected the received inquiry packet and the response packet 90 (signal 91) having been not addressed to itself, the logical interface 47 of the routing route is obtained with the signal 84 referring to the routing table 44 with the signal 92 with the network layer address of the destination included in the inquiry packet or the response packet 91 as a key.

The path manager 45 sends the inquiry packet or the response packet as output packet signals 95 and 83 through the logical interface.

The operation will now be described referring to the router 30_1 shown in FIG. 2 as follows:

When the router 30_1 inputs the inquiry packet 71 which is not addressed to itself from the routing route 60 (the route from left), the router 30_1 sends the inquiry packet 71 to the routing route 60 (the right route) which the routing table 44 designates.

Also, having received the response packet 72 which is not addressed to itself from the routing route 61 (the route from right), the router 30_1 sends the response packet 72 to the routing route 61 (the left route) which the routing table 44 designates.

It is to be noted that the router may execute the address resolution in the same way as the end equipment by providing the router with an equal function to the end equipment, except that the router relays the inquiry packet and the response packet.

Moreover, the NBMA network 10 in FIG. 2 may comprise a broadcast network.

[4] Also, in the above-mentioned invention [1], the path manager 45 may include a buffer (not shown) for temporarily storing the input packet 70 until the direct route of the data packet 70 is registered in the table 44.

Namely, when there is no buffer, as mentioned above, the transmission is executed via a preset routing route, but it becomes possible to make all of the dada packets 70 wait by using the buffer, and to transmit them to the destination end equipment through the direct route which has been decided in the mean time.

[5] Also, in the present invention, an end equipment which works as a receiving destination 40_2 connected to at least one subnetwork may comprise, as shown in FIG. 1, a path manager 45 which determines that a received inquiry packet 90 (91) is addressed to itself, prepares a response packet including its own data link layer address, and transmits the response packet 95 (83) by using a data link layer address of a source end equipment included in the inquiry packet 90 (91), instead of using the routing table 44.

[6] Also, in the present invention, the subnetwork may be an NBMA network, and as shown in FIG. 1, an end equipment which works as a receiving destination 40_2 may comprise; a signaling manager 50 which sets up a direct path, and a path manager 45 which determines that a received inquiry packet 90 (91) is addressed to itself and prepares a response packet including its own data link layer address.

The path manager 45 requests the signaling manager 50 to call a source end equipment 40_1 by using a data link layer address of the source end equipment 40_1 included in the inquiry packet 90 (91), instead of requesting the transmission of the response packet to the packet transmitter 43.

The signaling manager 50 calls for setting up a virtual connection. The path manager 45 requests the interface manager to prepare a logical interface in the interface 47 for the transmission to the virtual connection set up and may send the response packet through the prepared interface.

FIG. 3 shows an example (2) of the address resolution which uses an end equipment according to the present invention, and the arrangement of the network is the same as that shown in FIG. 2.

The destination end equipment 40_2 receives the inquiry packet 71 through the routing route 60 and prepares a response packet 72 for the inquiry packet 71. In addition, the destination end equipment 40_2 sets up a virtual connection 62 with the destination end equipment 40_1 and transmits the response packet 72 to the end equipment 40_1 through the virtual connection 62.

As a result, it becomes possible to directly transmit the response packet 72 to the end equipment 40_1 at a high speed without passing through the routing route 61 shown in FIG. 2.

[7] Also, in the present invention, as shown in FIG. 1, an end equipment which works as a receiving destination connected to a subnetwork for broadcast may comprise; an interface manager 42 which prepares a logical interface 47 between a network layer and a data link layer, and a path manager 45 which instructs the interface manager 42 to prepare a new logical interface whose destination is a source end equipment by using a data link layer address of the source end equipment included in a received inquiry packet 90 and which transmits a made response packet to the logical interface.

FIG. 4 shows an example (3) of the address resolution which uses an end equipment according to the present invention, wherein the arrangement of the network 10 is the same as that in FIG. 2 except that the network 10 shown in FIG. 2 is not an NBMA network but a broadcast subnetwork and that each of the logical subnetworks 20_1–3 is a VLAN (Virtual LAN).

The end equipment 40_2 which has received the inquiry packet 71 from the routing route 60 prepares the point-to-point type interface 47 for the source end equipment 40_1. The end equipment 40_2 transmits the response packet 72 to the end equipment 40_1 via the direct route 63 through the interface 47.

Thereafter, it becomes possible to directly transmit the packet to the end equipment 40_2 through the new interface 47.

[8] Also, in the above-mentioned invention [1], the logical interface 47 may be defined as one or a plurality of interface managing tables linked with each other composed of at least a logical interface name which is a parameter regarding the interface, its own network layer logical address, a network layer logical address of the destination and the data link layer address.

[9] Also, in the above-mentioned invention [8], the subnetwork may comprise a subnetwork for broadcast, and the data link layer may have a packet transmitter which receives a packet from the logical interface 47 and may transmit the packet by a method which is suitable to various communication media with the logical interface 47 as a key based on the data link layer address of the destination obtained from the interface managing table.

FIG. 5 shows an example (4) of the address resolution which uses an end equipment according to the present invention, and the arrangement of the network 10 is the same as that shown in FIG. 4.

If the network 10 is the Ethernet, for example, the packet transmitter puts the above-mentioned destination data link layer address at the position of a destination MAC address of an MAC header. When the address resolution is executed by using a CSMA/CD (Carrier Sense Multiple Access with Collision Detection) method which is for the media access in the Ethernet, the packet is transmitted on the communication media by broadcast.

[10] Also, in the above-mentioned invention [8], the subnetwork may comprise an NBMA network, and as shown in FIG. 1, may further comprise a signaling manager for setting up a virtual connection directed to a destination end equipment based on the data link layer address of the destination obtained from the interface managing table when the direct route of the destination end equipment does not exist.

FIG. 6 shows an example (5) of the address resolution which uses an end equipment according to the present invention, and the arrangement of the network 10 is the same as that shown in FIG. 2.

When there is found no direct route of the destination end equipment 40_2, the end equipment 40_1 executes a call 63 to the destination end equipment 40_2. The data packet 70 is transmitted to the provided virtual connection 62.

In the above-mentioned invention [1], it is possible to prepare the direct route to the end equipment beforehand by using the data link layer address of the end equipment included in the response packet before receiving the response packet and preparing the interface.

[11], [12] Also, in the above-mentioned invention [1] or [7], an end equipment, as shown in FIG. 7, may comprise a timer manager 48 connected to the interface manager 42. The timer manager 48 has a timer corresponding to each of the logical interfaces and manages the timer. The arrangement in FIG. 7 is the same as that in FIG. 1 except the timer manager 48 is added.

Namely, when the interface manager 42 prepares the logical interface, the timer manager 48 starts the timer. The timer manager 48 clears the value of the timer every time the packet is transmitted through the logical interface 47. When the packet transmission is not executed for a while and when the timer has exceeded a predetermined value, the logical interface is deleted from the interface table.

As a result, by deleting the logical interface prepared before more than a fixed time it becomes possible to avoid using a wrong interface even when the end equipment moves.

[13] In the above-mentioned invention [1], as shown in FIG. 8, a priority controller 49 may be mutually connected to the packet transmitter 43 of the source end equipment by signals 108, 109.

Namely, if both of the routing route and the direct route for the destination end equipment exist, the packet transmitter 43 transmits information 108 included in the received data packet 70 to the priority controller 49. The controller 49 determines to which of the direct route or the routing route the data packet 70 should be transmitted, and notifies the signal 109 to that effect to the packet transmitter 43. The packet transmitter 43 recognizes the interface 47 corresponding to the decided route by the routing table 44, and transmits the input data packet 70.

As a result, the data packet 70 is transmitted to the suitable route.

[14] Also, in the above-mentioned invention [1], as shown in FIG. 1, a user may prepare the interface and executes a user command for registering itself in the router before starting the communication with the user command processor 41. The user command processor 41 instructs the interface manager 42 to prepare the primary interface for the network connected to itself, or demands the preparation of a registration request packet to the path manager 45 through the registration portion 46 by a signal 103.

The path manager 45 instructs the signaling manager 50 of the data link layer to call the router. The signaling manager 50 calls for setting up the routing route. The interface manager 42 prepares the interface corresponding to the routing path. The path manager 45 registers an entry indicating that the router is connected to an ahead of the interface in the routing table 44.

[15] Also, in the above-mentioned invention [1], if the subnetwork may comprise a NBMA network, the routing route and the direct route may comprise a virtual connection.

In the above-mentioned invention [1], it is possible to apply the source end equipment, the destination end equipment and the router to an end equipment connected to the NBMA network or the broadcast network, and a router placed on the boundary of the LIS or VLAN which logically divides these networks.

BRIEF DESCRIPTION OF THE DRAWINGS

FIG. 11 is a diagram showing an embodiment (1) of an interface managing table in an end equipment or a router according to the present invention;

FIG. 12 is a diagram showing an embodiment of a routing table in an end equipment or a router according to the present invention;

FIG. 13 is a diagram showing an embodiment (2) of an interface managing table in an end equipment or a router according to the present invention;

FIG. 14 is a diagram showing an embodiment of a table in an end equipment according to the present invention;

Throughout the figures, like reference numerals indicate like or corresponding components.

DESCRIPTION OF THE EMBODIMENTS

Figure 9:
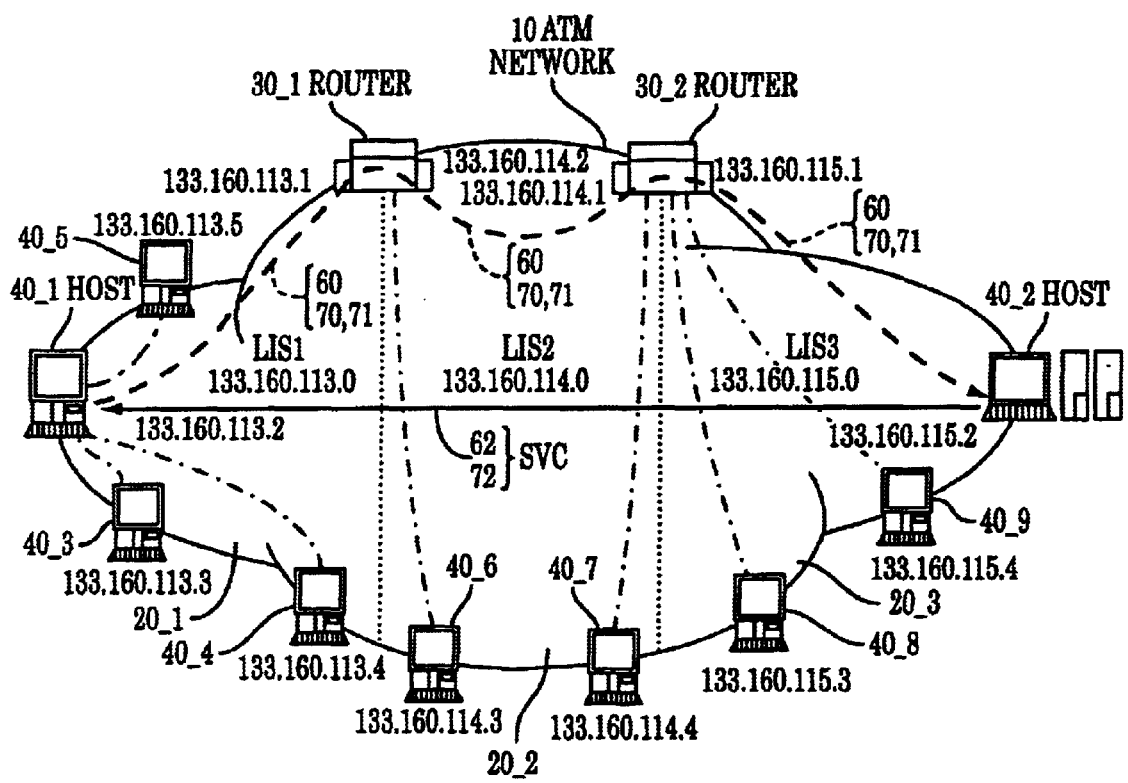
FIG. 9 is a block diagram showing an embodiment of the network which uses an end equipment and a router according to the present invention.

FIG. 9 shows an embodiment of the network which uses an end equipment (hereinafter referred to as a host) and a router according to the present invention. In this embodiment, an IP communication is especially executed on an "ATM network of NBMA" and an RISP protocol is adopted for the address resolution method.

Figure 1:
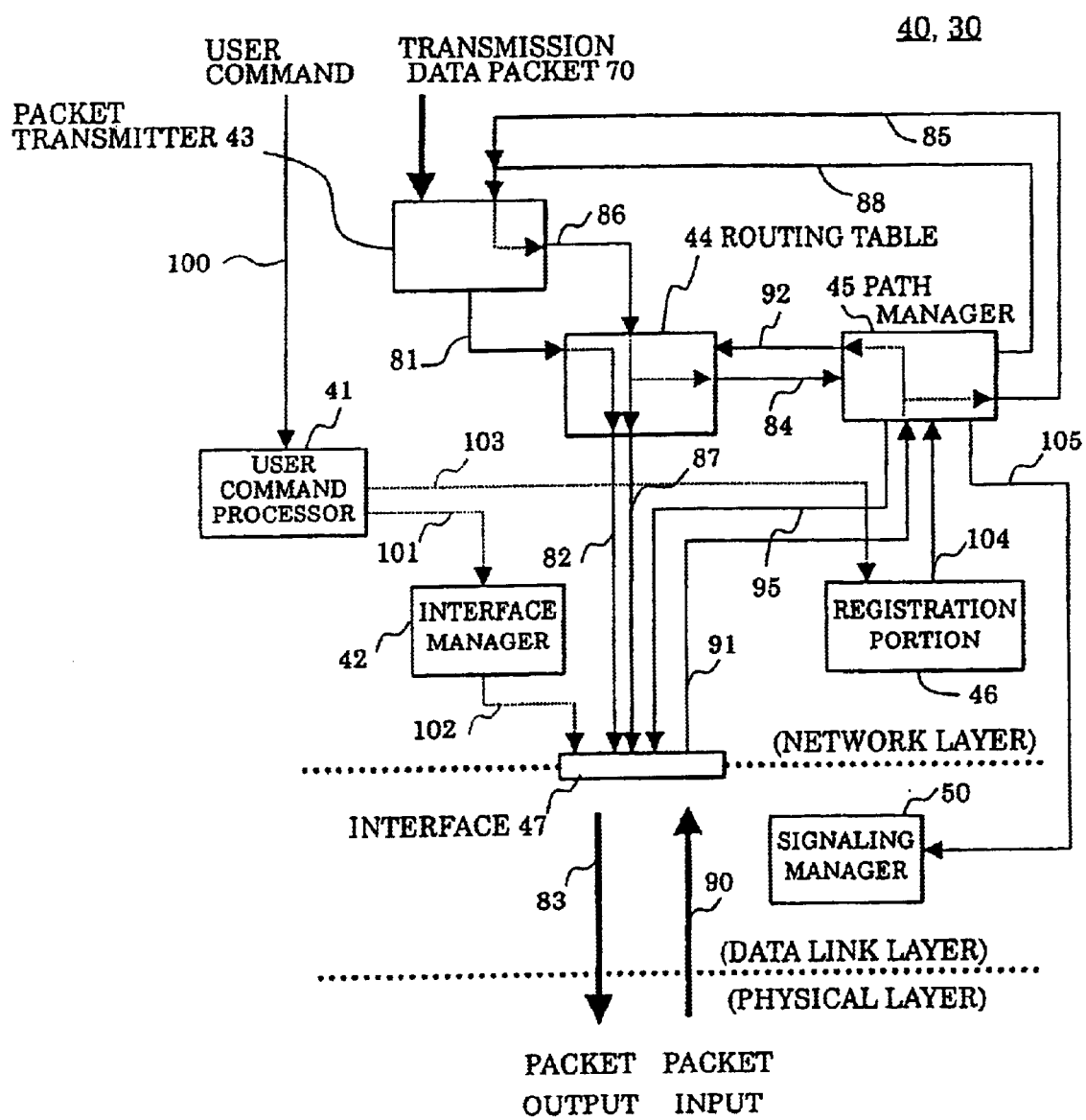
FIG. 1 is a block diagram showing a schematic arrangement (1) of an end equipment or a router according to the present invention.
Figure 2:
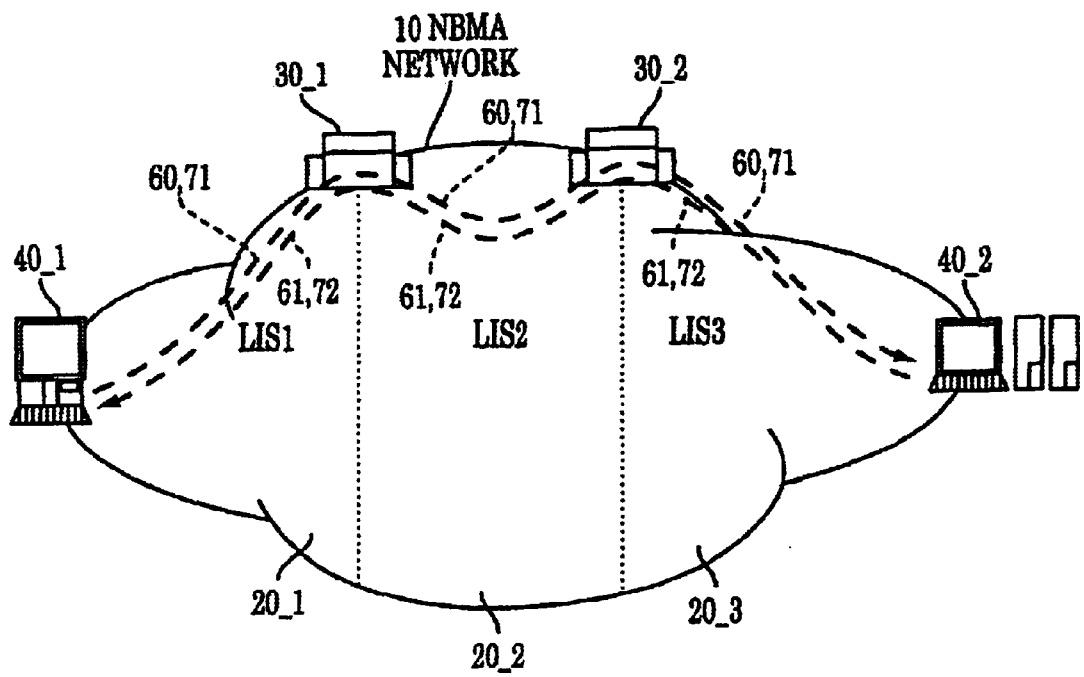
FIG. 2 is a block diagram showing an operation example (1) for an address resolution in the network which uses an end equipment and a router according to the present invention.
Figure 3:
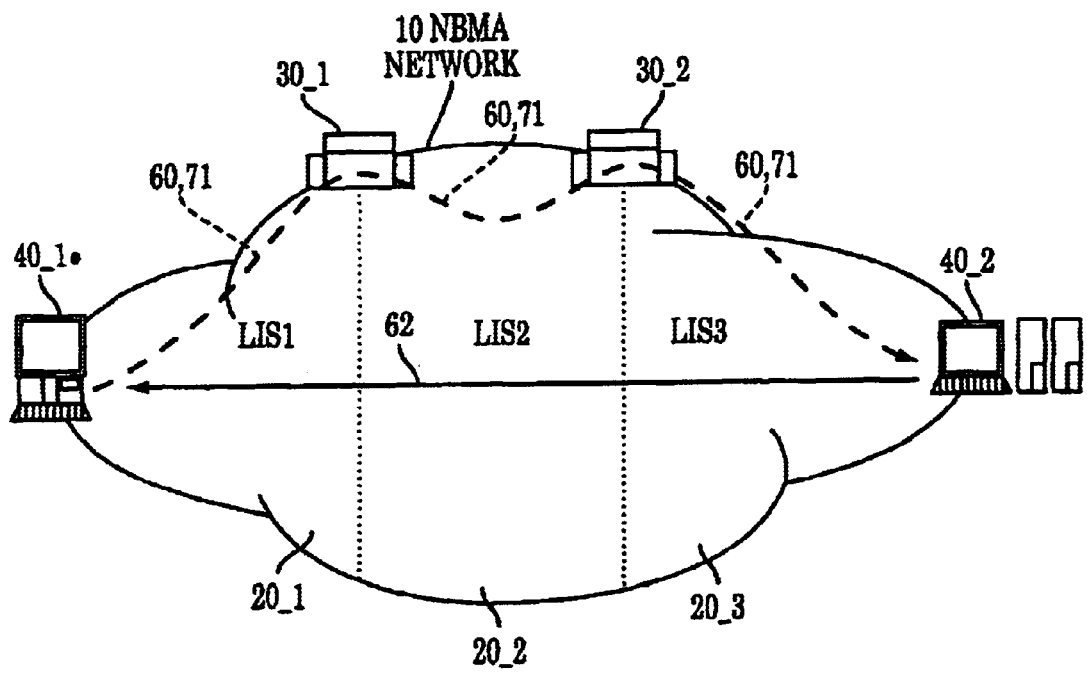
FIG. 3 is a block diagram showing an operation example (2) for an address resolution in the network which uses an end equipment and a router according to the present invention.
Figure 4:
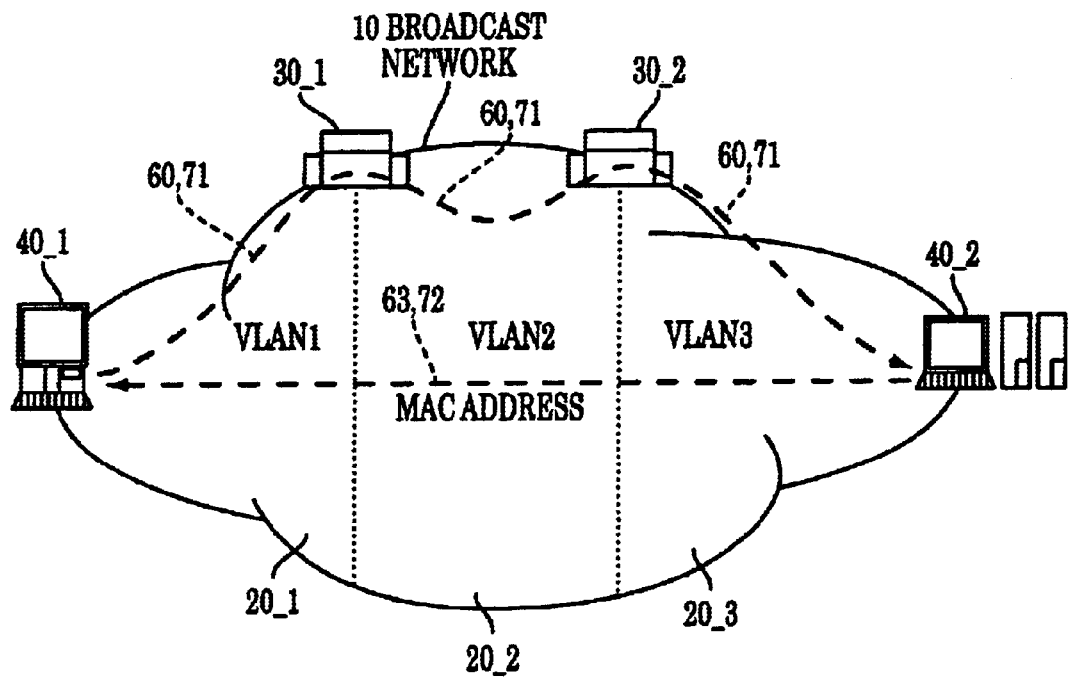
FIG. 4 is a block diagram showing an operation example (3) for an address resolution in the network which uses an end equipment and router according to the present invention.
Figure 5:
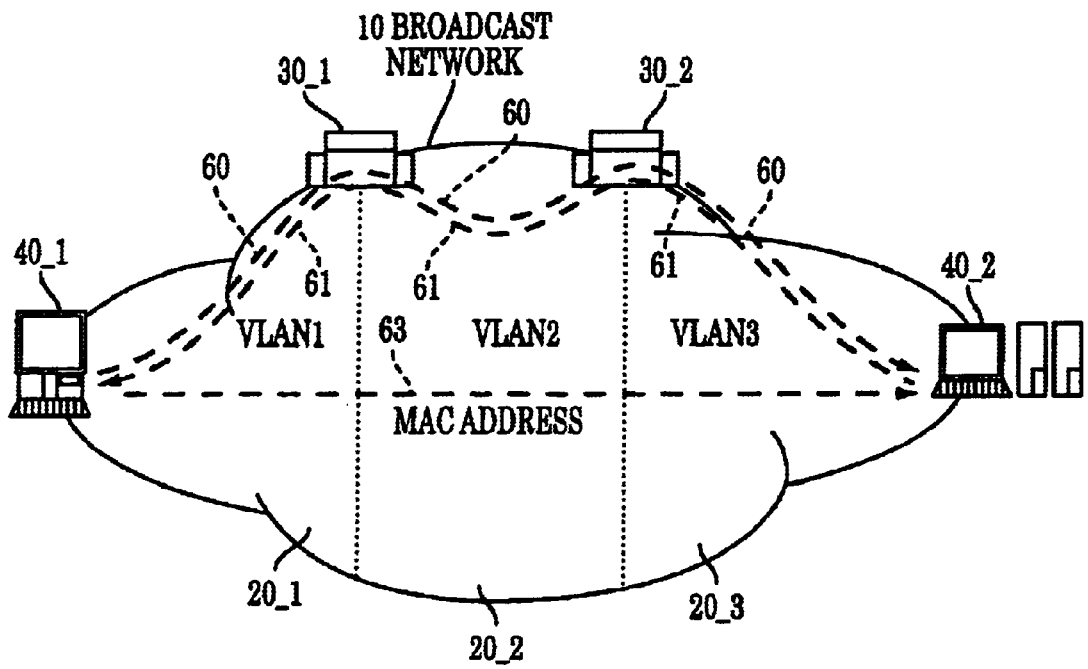
FIG. 5 is a block diagram showing an operation example (4) for an address resolution in the network which uses an end equipment and router according to the present invention.
Figure 6:
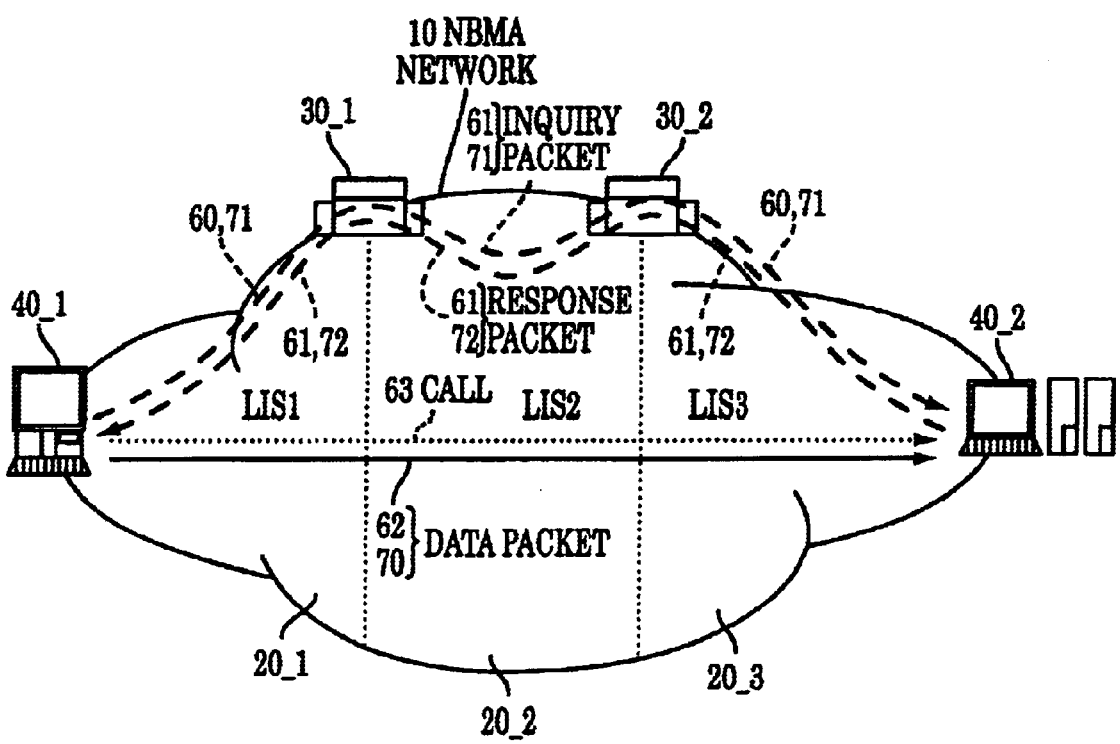
FIG. 6 is a block diagram showing an operation example (5) for an address resolution in the network which uses an end equipment and router according to the present invention.

While the arrangement of the ATM network 10 is the same as that shown in FIG. 3, it is different that the hosts 40_3–5, the hosts 40_6, 40_7, and the hosts 40_8, 40_9 are further connected to subnetworks 20_1–20_3 (hereinafter occasionally referred to as LIS1–3), respectively. Also, in each of the hosts 40_1–40_9 and the routers 30_1, 30_2 a priority controller 49 connected to a packet transmitter 43 shown in FIG. 8 is further added to the same arrangement as that of the end equipment shown in FIG. 7.

IP addresses of the above-mentioned LIS1–3 are "133.160.113.0", "133.160.114.0", and "133.160.115.0", respectively. The IP addresses of the router 30_1 on the sides of the LIS1 and LIS2 are "133.160.113.1"and "133.160.114.2", respectively. The IP addresses of the router 30_2 on the sides of the LIS2 and LIS3 are "133.160.114.1" and "133.160.115.1", respectively. The IP addresses of the hosts 40_1–9 are "133.160.113.2", "133.160.115.2", "133.160.113.3", "133.160.113.4", "133.160.113.5", "133.160.114.3", "133.160.114.4", "133.160.115.3", and "133.160.115.4", respectively.

Figure 10:
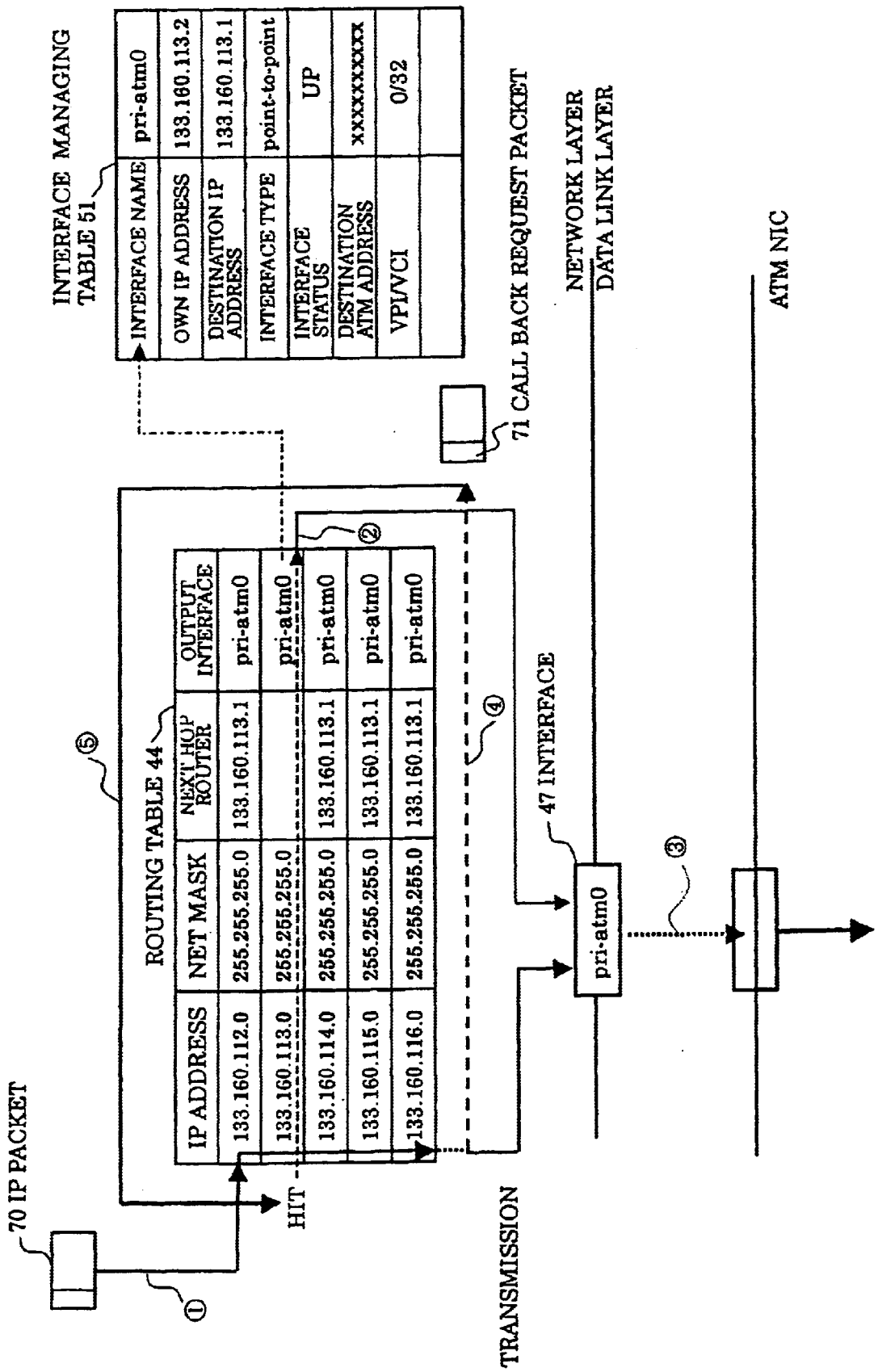
FIG. 10 is a diagram showing an embodiment of the first stage status of a table in an end equipment or a router according to the present invention.
Figure 15:
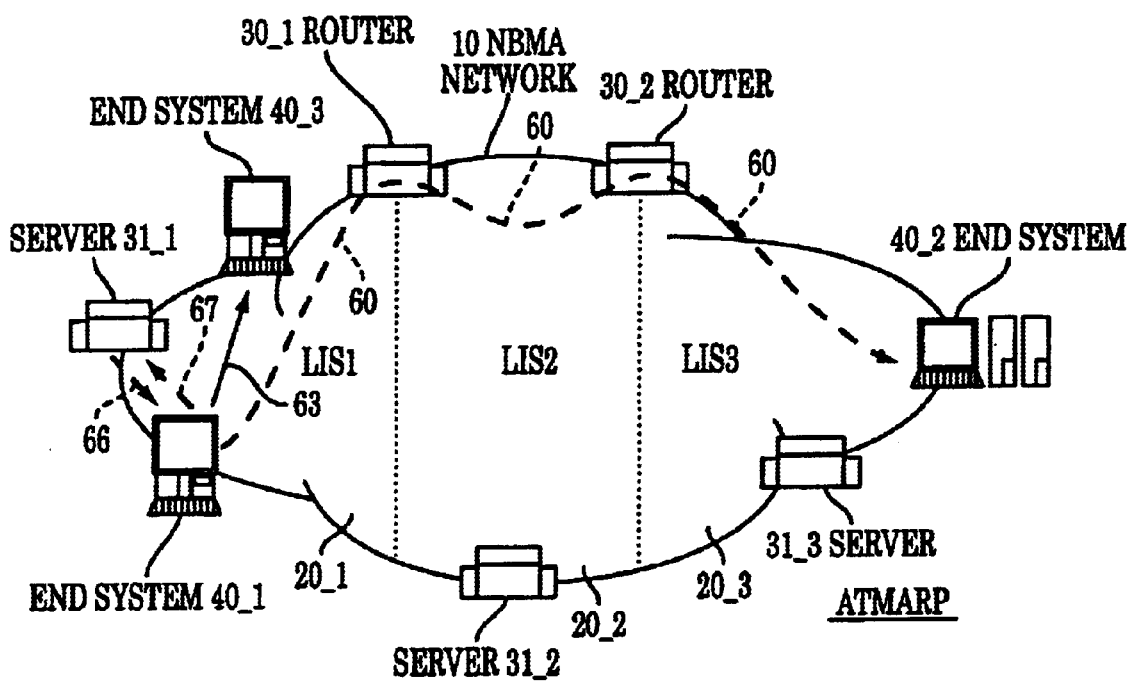
FIG. 15 is a block diagram showing an operation example (1) for an address resolution in the network which uses a conventional end equipment.
Figure 15B:
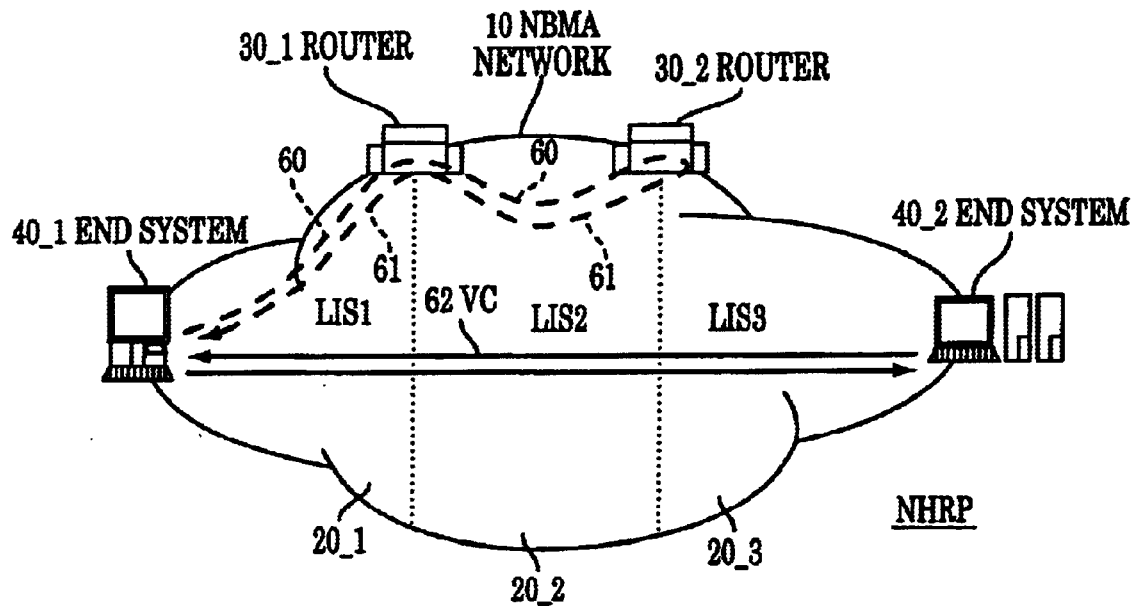
Figure 16:
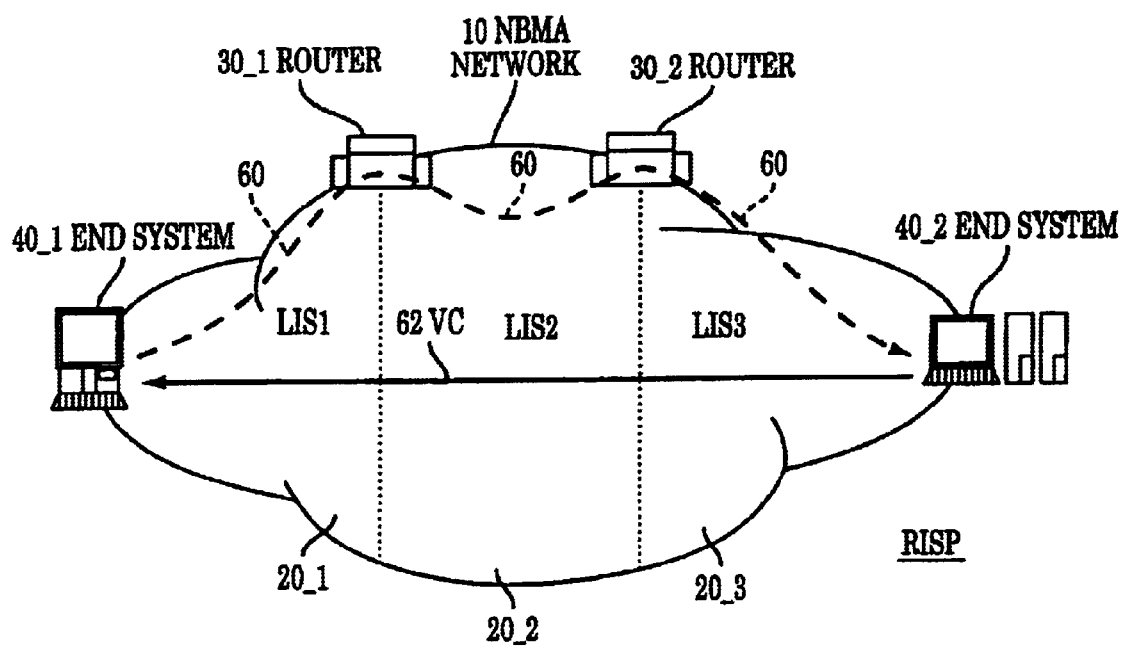
FIG. 16 is a block diagram showing an operation example (2) for an address resolution in the network which uses a conventional end equipment.
Figure 17:
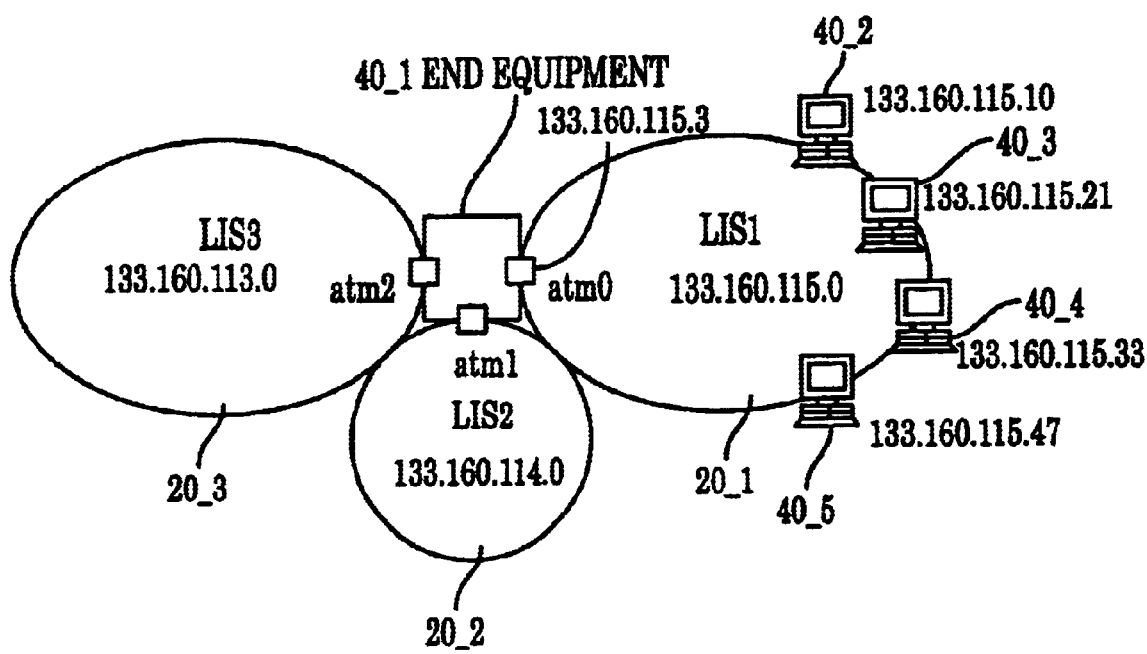
FIG. 17 is a block diagram showing an operation example (3) for an address resolution which uses a conventional end equipment.
Figure 18:
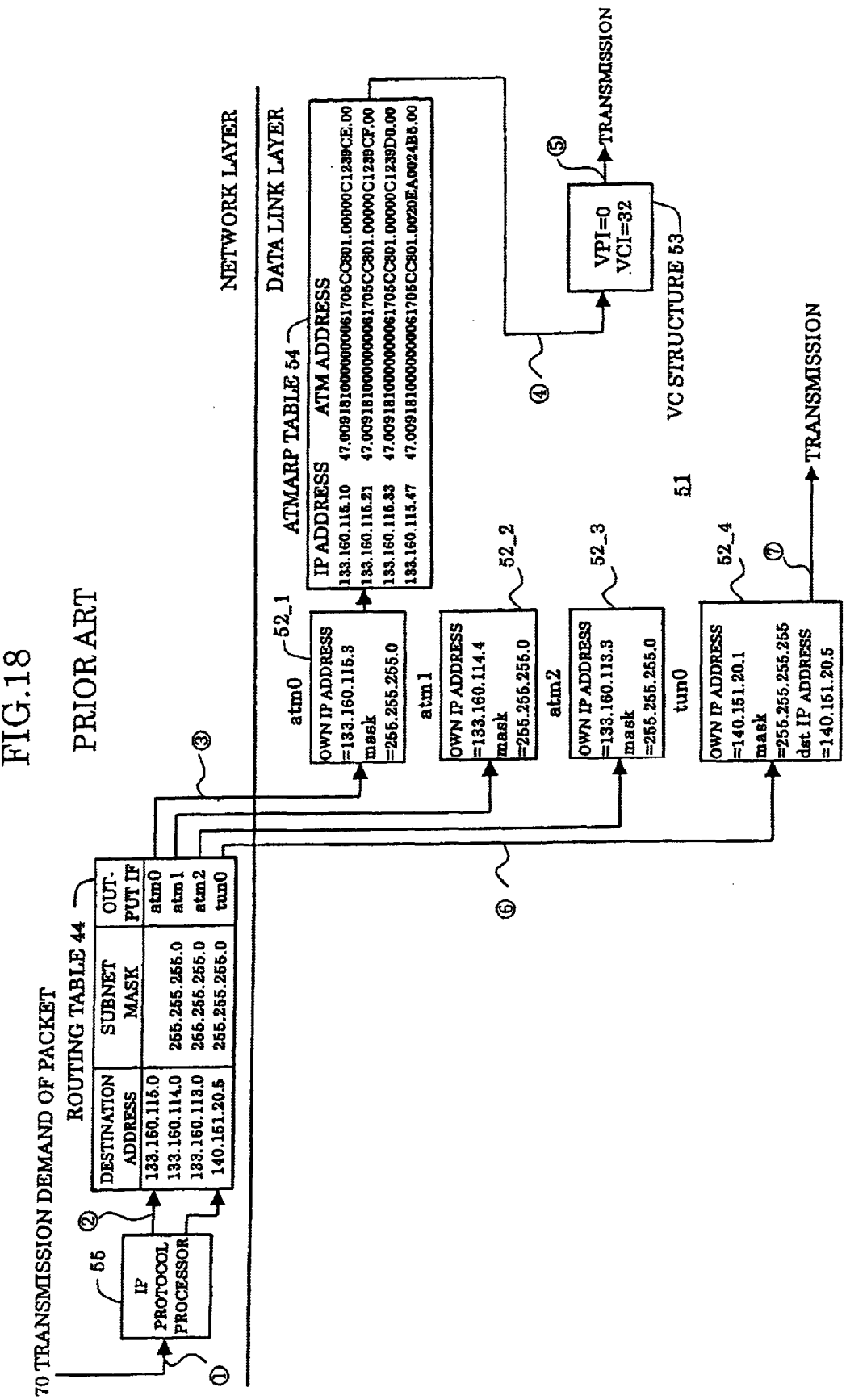
FIG. 18 is a diagram showing an example of a table in a conventional end equipment.

FIG. 10 shows an embodiment of a table in the host 40 and the router 30 of the present invention. In this particular embodiment, a routing table 44 and an interface managing table 51 before a direct connection is set up are shown.

For instance, in the elements of the routing table 44 for the host 40_1, the IP addresses of the network "133.160.112.0", "133.160.113.0"–"133.160.116.0" are registered, "a net mask" of "255•255•255•0" is registered for all of the IP addresses, the IP address "133•160•113•1" of the router 30_1 as "a next hop router" is registered for all of the IP addresses, and a primary interface pri_atm0 as "an output interface" is registered.

It is to be noted that the table 44 also shows entries of the subnetwork of the IP addresses "133.160.112.0" and "133.160.116.0" besides the subnetworks 20_1–20_3 shown in FIG. 9.

Moreover, in the interface managing table 51, its own IP address="113.160.113.2", as an attribute of the "interface pri_atm0" a destination IP address="113•160•113•1", an interface type="point-to-point", an interface status="UP (available)", a destination ATM address="xxxxxxxxxxx", and a VPI/VCI=0/32 are registered.

A retrieval operation for the table is as follows: ①The IP address of an IP packet 70="133.160.113.1" is retrieved as a key. ④ In the absence of hit, a call back request packet 71 of the destination IP address=133.160.113.1 is prepared. ⑤ The destination IP address 133.160.113.0 masked with the net mask=255.255.255.0 is retrieved as a key. ② The entry of the IP address=133.160.113.0 is hit and the request packet 71 is outputted to the interface pri-atm0 the output interface of the entry designates. ③ A data link layer outputs the packet 71 to a route specifically corresponding to the interface pri-atm0.

FIG. 11 shows another embodiment of the interface managing table 51. In this embodiment, the managing table 51 comprises an interface structure 52 shown in FIGS. 11A–C, and a VC structure described later. FIG. 11A shows an embodiment of a primary interface structure 52_1 defined by a user command. This interface shows a primary interface pri_atm0 which the host 40_1 has made for the home subnetwork before the communication starts. The elements of this interface pri_atm0 include its own IP address, the network mask and the interface type.

It is to be noted that the interface pri_atm0 can be used as an interface to a path which has registered itself in the router or can be defined as a virtual interface which is connected nowhere.

FIG. 11B shows an embodiment of an interface structure 52_2 to a new host 40.

For instance, when the path (=virtual connection) to the host 40_2 of the IP address="133.160.115.2" is newly set up, a single point-to-point type interface is newly allocated to this path. At this time, the interface structure 52_2 is newly prepared with the information of the interface pri_atm0 (the interface shown in FIG. 11A), as the information of this new interface, which is the nearest to a destination host. Namely, the interface structure 52_2 is prepared by further adding the destination IP address 133.160.115.2 to the reproduced structure 52_1.

FIG. 11C shows an example of defining an interface structure 52_3 linked with the VC structure for managing the VC. In this example, the element "flag" showing the interface status, and the element "pointer to the VC structure" for linking with the VC structure are further added to the element of the interface structure 52_2.

FIG. 12 shows an embodiment of the routing table 44 which the host or the router of the present invention holds, and FIGS. 12A–C show routing tables 44_1–44_3 (hereinafter occasionally abbreviated as "44") of the host 40_1 and the routers 30_1, 30_2, respectively. In addition, FIG. 12D specifically shows the routing table 44_1 after the address resolution of the host 40_1.

Each entry of the routing tables 44 comprises "the IP address" of the destination host of the IP packet, "the net mask", the next hop "router address", and "the output interface".

Figure 7:
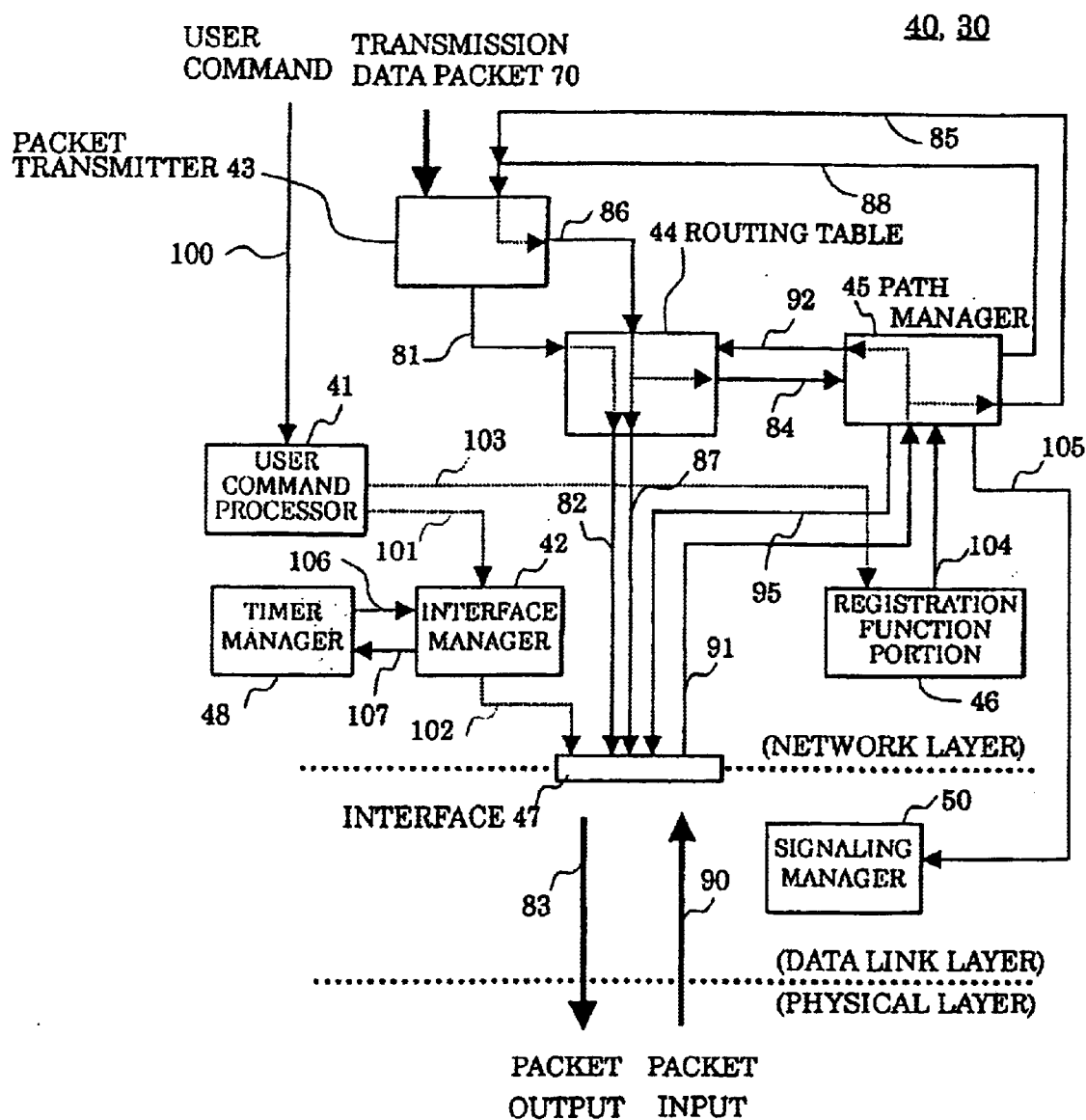
FIG. 7 is a block diagram showing a schematic arrangement (2) of an end equipment or a router according to the present invention.
Figure 8:
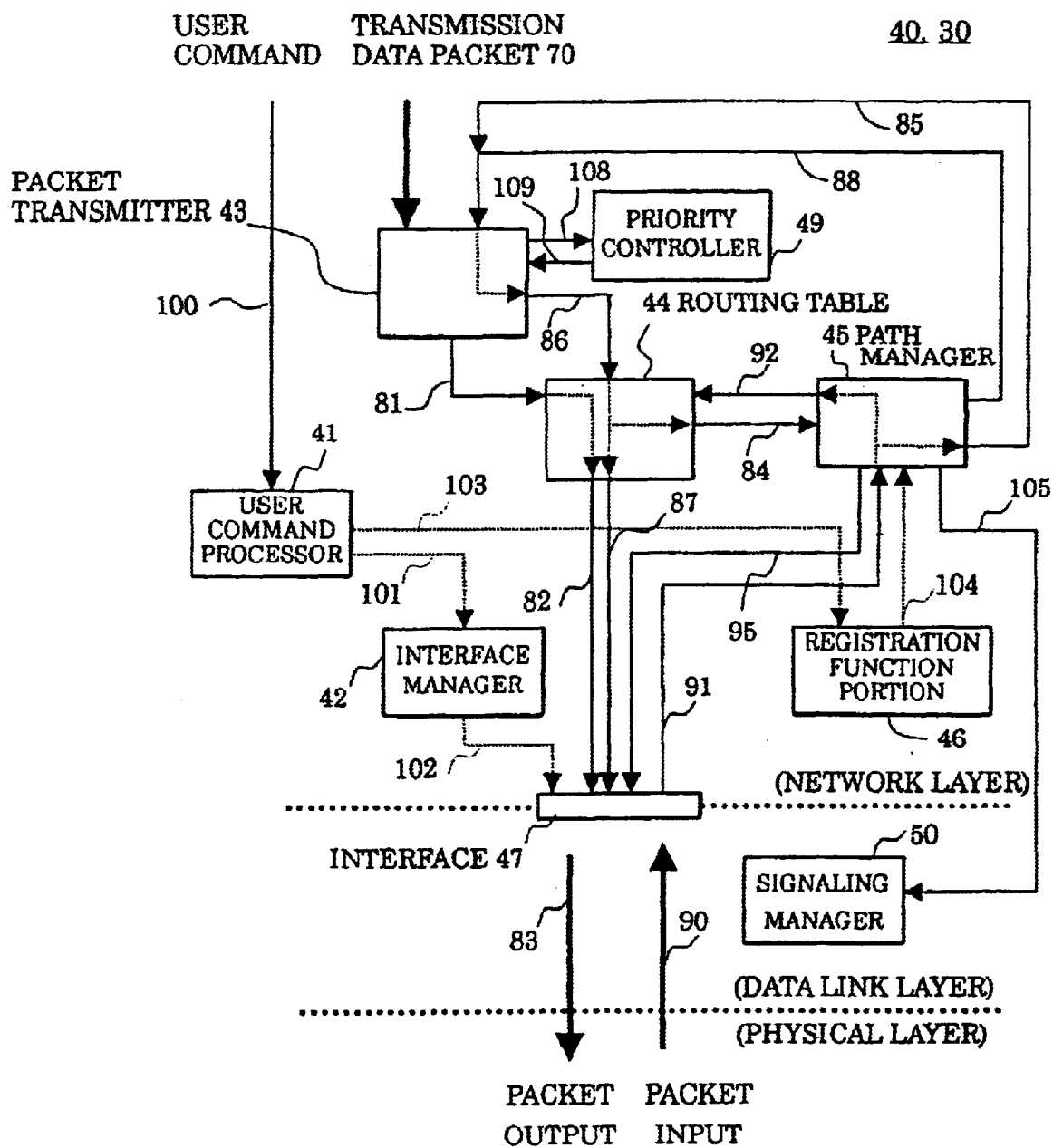
FIG. 8 is a block diagram showing a schematic arrangement (3) of an end equipment or a router according to the present invention.

The operation when a transmission demand of the IP packet for the host 40_2 from the host 40_1 shown in FIG. 9 by a communication application or the like is generated will now be described referring to FIGS. 7 and 8 as follows:

In FIG. 7, the packet transmitter 43 of the host 40_1 which has received the IP data packet 70 retrieves the routing table 44 (see the table 44_1 in FIG. 12A) with the IP address of the destination host 40_2 included in the packet 70, for instance, "133.160.115.2" as a key, and recognizes that the IP address is not registered and there is no direct path to the host 40_2. The packet transmitter 43 requests a path manager 45 with a signal 84 to prepare the call back request packet which is an inquiry packet.

Moreover, the packet transmitter 43 retrieves "the IP address" from the routing table 44_1 with the destination IP address "133.160.115.2" masked by "the net mask" of each entry as a key. Since in an entry E1 only the address "133.160.115.0" which is the destination IP address "133.160.115.2" masked by "the net mask= 255.255.255.0"" is the same as the above-mentioned "IP address", the output interface="atm0" is obtained. Namely, the packet outputted to the interface atm0 is to reach the next hop router 30_1 (=gate way: the IP address "133.160.113.1") without fail.

In addition, the packet transmitter 43 transmits the data packet 70 to the interface atm0 included in an output interface 47 as a signal 81 (82).

The path manager 45 prepares the call back request packet which demands the ATM address of the host 40_2 to transmit it to the interface atm0 as a signal 95.

It is to be noted that the path manager 45 may request the packet transmitter 43 to transmit the call back request packet with a signal 88.

In the data link layer, the data packet 70 and the call back request packet (hereinafter referred to as "71") are transmitted to a routing path 60 corresponding to the interface atm0. In this case, since a temporarily storing operation by a buffer is not executed, the data packet 70 is transmitted for the time being.

In FIG. 9, the data packet 70 and the request packet 71 sent from the host 40_1 are transmitted to the router 30_1 through a routing route 60.

In FIG. 7, the router 30_1 includes the routing table 44_2 shown in FIG. 12B as the routing table 44. The path manager 45 receives the data packet 70 and the request packet 71 of the destination IP address="133.160.115.2" as a signal 90 (91).

The router 30_1 retrieves the routing table 44_2 with the destination IP address "133.160.115.2" as a key, and in the same way as the host 40_1 is retrieved, the router 30_1 hits an entry E2 whose IP address is "133.160.115.0" without any direct path, recognizes the interface atm0 of the next hop router 30_2 (=IP address "113.160.114.1"), and outputs the data packet 70 and the request packet 71 to the interface atm0 included in the interface 47 as the signal 95.

In the data link layer of this router 30_1, the data packet 70 and the request packet 71 are outputted from the routing path 60 (IP address "133.160.114.2") corresponding to the interface atm0. The router 30_2 receives the data packet 70 and the request packet 71 through the route 60 as shown in FIG. 9.

In FIG. 7, the router 30_2 has the routing table 44_3 shown in FIG. 12C as the routing table 44. The path manager 45 of the router 30_2 retrieves the routing table 44_3 with the destination IP address of the packets 70, 71="133.160.115.2" as a key, hits an entry E3, and recognizes that an interface atm3 is connected to the direct path toward the host 40_2.

In FIG. 9, the router 30_2 transmits the packets 70, 71 to the host 40_2 through the interface atm3 and the direct path 60.

The host 40_2 which has received the request packet 71 executes the operations ①–③ as follows:
① A point-to-point type interface is prepared to set up the virtual connection between the host 40_2 and 40_1.
② A call of an SVC (Switched Virtual Connection) from the host 40_2 to the host 40_1 is generated.
③ The transmission of a call back response packet is carried out by using the SVC set up.

FIG. 13 shows an embodiment of the interface managing table which the host 40_2 holds. In this embodiment, the managing table comprises the interface structure 52 in FIG. 13A and the VC structure 53 in FIG. 13B. The elements of the interface structure 52 are the interface name, its own IP address, the destination IP address, the interface type, the interface status, and the pointer to the VC structure 53. The VC structure 53 manages an ATM connection (SVC), and its elements are the destination ATM address, the VPI/VCI (Virtual Path Identifier/Virtual Channel Identifier) which is path information, and an AAL (ATM Adaptation Layer) type.

Receiving the request packet 71 with the signal 90 (91) in FIG. 7, the path manager 45 of the host 40_2 requests the interface manager 42 to prepare the point-to-point type interface for setting up the direct ATM connection between the hosts 40_1 and 40_2 after confirming that the SVC to the source host 40_1 has not been yet established. The manager 42 writes "atm1", "133.160.115.2", "133.160.113.2", and "point-to-point" in each of the elements of the newly made interface structure 52 shown in FIG. 13A, respectively.

Also, the path manager 45 instructs a signaling manager 50 to generate a call by using the ATM address of the source host 40_1 included in the request packet 71. The signaling manager 50 generates a call and sets up an ATM direct connection (SVC:hereinafter referred to as direct path) 62 based on the prior art between the host 40_2 and 40_1. The VP for the direct path 62 is then determined. Moreover, the VC structure 53 is prepared for the direct path 62 and "xxxx xxxxxxx", "0/32", and "AAL5" are written in the elements of the structure 53. Afterwards, the address of the VC structure 53 is written in the pointer of the interface structure 52 so that the VC structure 53 may be referred from the interface structure 52.

When the above-mentioned operation is completed, the path manager 45 prepares the call back response packet 72 and transmits it directly to the above-mentioned newly prepared interface atm1 as the signal 95.

As a result, the response packet 72 is sent to the source host 40_1 (see FIG. 9).

It is to be noted that the path manager 45 may transmit the response packet 72 according to the routing route after transferring the response packet 72 to the packet transmitter 43 and then the packet transmitter 43 retrieves the routing table 44, instead of directly transmitting the same to the interface atm1.

The host 40_1 prepares the interface structure 52 which is an interface atm4 of a newly prepared point-to-point type and the VC structure 53 of the direct path 62 so that the host 40_1 may utilize the direct path 62 set up based on the IP address and the ATM address of the destination host 40_2 included in the received response packet 72. An address indicating the VC structure 53 is written in "the pointer" which is an element of the structure 52 and the interface atm4 is allocated to the direct path 62.

In addition, the host 40_1 prepares an entry E4 for registering the interface atm4 connected to the direct path 62 in the routing table 44.

FIG. 14 shows an embodiment of the interface and the entry of the routing table which the host 40_1 has made, in which FIGS. 14A and 14B show the interface structure 52 and the VC structure 53, respectively and FIG. 14C shows the entry E4 to be registered in the routing table 44.

Namely, the elements of the interface structure 52 are the interface name="atm4", the own IP address= "133.160.113.2", the IP address of the destination host 40_2="133.160.115.2", the interface type="point-to-point", the interface status="UP", and the pointer="the address of the VC structure".

The elements of the VC structure 53 are the destination ATM address="xxxxxxxxxxx", the VPI/VCI="0/32", and an ALL type="ALL5".

The elements of the entry E4 registered in the routing table 44 are the destination IP address="133.160.115.2", the net mask="255.255.255.255", the next hop router= "133.160.115.2", and the output interface="atm4".

FIG. 12D shows the routing table 44_1 in which the abovementioned entry E4 has been registered. The data packet 70 addressed to the host 40_2 is outputted to the ATM connection 62 through the interface atm4 and is directly sent to the host 40_2.

As a result, it becomes possible for the host 40_1 to execute the packet transmission with the host 40_2 by using a routing function.

Also, the host 40_1 recognizes the ATM address of the host 40_2 by a signaling function at the call arrival or the call back response packet, thereby setting up the direct path between the hosts 40_1 and 40_2 without using an ARP function in the data link layer.

Generally, in the protocol such as a TCP the packet is transmitted in both directions. For instance, if the host 40_1 transmits the packet to the host 40_2, the host 40_2 transmits an ACK packet to the host 40_1. The above-mentioned operation indicates the procedure by which the direct path from the host 40_1 to the host 40_2 is set up. Since some change is reflected in order to use the direct path as a course to the host 40_2 in the routing table 44 of the host 40_1, the packet is transmitted through the direct path after the direct path is set up.

On the other hand, the host 40_2 has not registered therein that the direct path to the host 40_1 is an ATM direct connection 63 in the routing table 44. Therefore, on the side of the host 40_2, the call back request packet 71 (not shown) is transmitted to the host 40_1 with the ACK packet for the packet arrived from the host 40_1 as a trigger. The request packet 71 is transferred according to a routing path 61 (not shown) through the routers 30_2, 30_1 in the same way as the host 40_1 sends the call back request packet 71 to reach the host 40_1.

Since the direct connection 63 is set up between the hosts 40_1 and 40_2, the host 40_1 does not call new virtual connections and transmits the call back response packet on the virtual connection 62. The operation of the host 40_2 after receiving the response packet is the same as that of the host 40_1 in which the host 40_2 registers in the routing table 44 that the direct path to the host 40_1 is the ATM direct connection 62.

Moreover, the priority controller 49 (see FIG. 8) may make instructions for the routing route through the interface atm0 referring to an entry E5, based on the information included at the header of the data packet 70.

In addition, when the interface atm4 is prepared, a timer manager 48 starts a timer corresponding to the interface atm4. When the data packet 70 is not transmitted for more than 20 minutes, for example, the status of the interface structure is set to "DOWN" where the interface is deleted.

As described above, an end equipment according to the present invention is arranged such that a network layer of the end equipment which works as a transmitting source transmits an input packet to a direct route or a routing route with the packet transmitter referring to the routing table, and when the direct route is not registered a path manager transmits an inquiry packet, demands a preparation of a logical interface of the direct route based on a data link layer address of the destination included in the received response packet and registers the prepared logical interface in the routing table.

In the network layer of a router, the inquiry packet or the response packet the path manager has received and which is not addressed to itself are transmitted to the direct route or the routing route referring to the routing table.

In the network layer of the destination end equipment, when the inquiry packet is received, the path manager prepares the response packet including its own data link layer address and requests a signaling manager to set up the direct route between the source end equipment and the destination end equipment by using the data link layer address of the end system of the source included in the inquiry packet.

Therefore, it becomes possible to prepare the direct route without any address resolution in the data link layer, to realize an efficient communication, and to provide an address resolution protocol with a good portability.

What we claim is:

1. An end equipment which works as a transmitting source connected to at least one subnetwork comprising:

an interface manager which prepares a logical interface, provided between a network layer and a data link layer, corresponding to a direct route or a routing route, a routing table indicating a corresponding relationship between a network layer address of a destination of an input packet and the logical interface, a packet transmitter which transmits the input packet to the logical interface referring to the routing table with the network layer address as a key, and a path manager which transmits both of an inquiry packet for inquiring a data link layer address of the destination and the input packet to a preset logical interface of the routing route when the logical interface for the direct route of the input packet is not registered in the table and which registers the logical interface the interface manager has made in the routing table by demanding the interface manager to prepare the logical interface for the direct route based on the data link layer address of the destination included in a received response packet to the inquiry packet.

2. An end equipment, which works as a receiving destination of the inquiry packet and an input packet transmitted by the end equipment claimed in claim 1, connected to at least one subnetwork comprising:

a routing table indicating a corresponding relationship between a network layer address of a destination for an inquiry packet which is an input packet and a logical interface, a path manager which determines that the inquiry packet received is addressed to itself and prepares a response packet to the inquiry packet including its own data link layer address, and a packet transmitter which transmits the response packet to a source end equipment, that is the end equipment claimed in claim 1, through a routing route of the logical interface retrieved from the routing table with a network layer address of the source end equipment included in the inquiry packet addressed to itself as a key.

3. An end equipment as claimed in claim 1 wherein the path manager includes a buffer for temporarily storing the input packet until the direct route of the input packet is registered in the table.

4. An end equipment, which works as a receiving destination of the inquiry packet and the input packet transmitted by the end equipment claimed in claim 1, connected to at least one subnetwork comprising:

a path manager which determines that the inquiry packet received is addressed to itself, prepares a response packet to the inquiry packet including its own data link layer address, and transmits the response packet to a source end equipment, that is the end equipment claimed in claim 1, by using a data link layer address of the source end equipment included in the inquiry packet.

5. An end equipment, which works as a receiving destination of the inquiry packet and the input packet transmitted by the end equipment claimed in claim 1, connected to at least one NBMA subnetwork comprising:

a signaling manager which sets up a direct path, and a path manager which determines that the inquiry packet received is addressed to itself, prepares a response packet to the inquiry packet including its own data link layer address, requests the signaling manager to call a source end equipment, that is the end equipment claimed in claim 1, by using a data link layer address of the source end equipment included in the inquiry packet, and transmits the response packet to the source end equipment through the direct path having been set up.

6. An end equipment as claimed in claim 1 wherein the logical interface is defined as one or a plurality of interface managing tables linked with each other composed of at least a logical interface name, its own network layer logical address, a network layer logical address of the destination and the data link layer address.

7. An end equipment as claimed in claim 6 wherein the subnetwork comprises a subnetwork for broadcast, and the data link layer has a packet transmitter which receives a packet from the logical interface and transmits the packet based on the data link layer address of the destination obtained from the interface managing table.

8. An end equipment as claimed in claim 6 wherein the subnetwork comprises an NBMA network, and further comprising;

a signaling manager for setting up a direct path to a destination end equipment based on the data link layer address of the destination obtained from the interface managing table when the direct route of the destination end equipment does not exist.

9. An end equipment as claimed in claim 1, further comprising a timer manager for managing a timer corresponding to the logical interface, the interface manager for instructing the timer manager to start the timer when the logical interface is made, and the timer manager for clearing a value of the timer every time the packet is transmitted through the logical interface and deleting the logical interface from the interface table when the timer has exceeded a predetermined value.

10. An end equipment as claimed in claim 1, further comprising a priority controller for determining to which of the direct route or the routing route the input packet is transmitted based on information included in the input packet, and the packet transmitter transmitting the input packet to the route which the controller has decided.

11. An end equipment as claimed in claim 1, further comprising a registration portion for making a registration process of the subnetwork in a router managing the subnetwork, and a user command processor for receiving a user command instructing to prepare an primary interface for the network connected to itself, instructing the interface manager to prepare the interface, receiving the user command instructing the registration process, and demanding the path manager to prepare a registration request packet through the registration portion, and the path manager instructing the signaling manager of the data link layer to call the router in order to preset the routing route, demanding the interface manager to prepare the logical interface corresponding to the routing route, and registering an entry indicating that the router is connected to an ahead of the logical interface in the routing table.

12. An end equipment as claimed in claim 1 wherein the subnetwork is an NBMA network, and the routing route and the direct route comprise a virtual connection.

13. An end equipment which works as a receiving destination connected to a subnetwork for broadcast comprising:

an interface manager which prepares a logical interface between a network layer and a data link layer, and a path manager which instructs the interface manager to prepare a new logical interface whose destination is a source end equipment by using a data link layer address of the source end equipment included in a received inquiry packet for inquiring a data link layer address of the destination and which transmits a response packet to the inquiry packet to the logical interface.

14. An end equipment as claimed in claim 13, further comprising a timer manager for managing a timer corresponding to the logical interface, the interface manager for instructing the timer manager to start the time when the logical interfaces are made, and the timer manager for clearing a value of the timer every time the packet is transmitted through the logical interfaces and deleting the logical interface from the interface table when the timer has exceeded a predetermined value.

* * * * *